United States Patent [19]

Boyllin

[11] 4,215,829
[45] Aug. 5, 1980

[54] COILABLE TAPE MEASURES

[75] Inventor: John A. Boyllin, Birmingham, England

[73] Assignee: Rabone Chesterman Limited, Birmingham, England

[21] Appl. No.: 36,010

[22] Filed: May 4, 1979

[30] Foreign Application Priority Data

May 10, 1978 [GB] United Kingdom ............... 18601/78

[51] Int. Cl.² .................. G01B 3/10; B65H 75/48
[52] U.S. Cl. .................... 242/107; 33/138
[58] Field of Search .................... 33/138, 139, 140; 242/84.8, 107, 107.2, 107.3, 107.4 R, 107.4 C, 107.5, 107.6, 107.7

[56] References Cited

U.S. PATENT DOCUMENTS

| | | | |
|---|---|---|---|
| 3,216,117 | 11/1965 | Stowell | 242/84.8 X |
| 4,067,513 | 1/1978 | Rutty et al. | 242/84.8 X |
| 4,142,693 | 3/1979 | Czerwinski | 242/107 |

*Primary Examiner*—Harry N. Haroian

[57] ABSTRACT

A coilable tape measure comprising a casing, a coilable tape and a recoil spring having its outer end connected to the inner end of the tape, the spring being mounted on a fixed inner spool and the tape being mounted on a rotatable outer spool and the inner spool being prevented from rotating by pegs in the casing engaging holes in the inner spool.

6 Claims, 6 Drawing Figures

COILABLE TAPE MEASURES

This invention relates to coilable steel tape measures of the kind comprising a casing with an interior space enclosing a coilable tape and a recoil spring, the inner end of the spring being fixed with respect to the casing and the other end of the tape issuing through an opening in the side of the casing, and the inner end of the tape being connected to the outer end of the spring.

In many known measures of this kind the inner end of the spring is fixed directly to a part, which in some cases is a spindle, provided on the casing. This arrangement gives rise to frictional forces between the spring and the adjacent wall of the casing, as the spring moves when the tape is withdrawn and recoiled in the casing. This disadvantage has to some extent been aleviated by enclosing the spring within a part which has flanges which intervene between the casing the spring, said part being arranged to rotate as the tape is uncoiled and coiled in the casing.

It is the object of the invention to provide a coilable tape measure of the kind referred to in which wear is minimised, particularly in the region of the spring, and which is furthermore convenient to manufacture.

According to the present invention there is provided a coilable tape measure comprising a casing, a coilable tape having an outer end extending through an opening in the wall of the casing, and a recoil spring having its outer end connected to the inner end of the tape, the spring being mounted on an inner spool and the tape being mounted on a concentric outer spool rotatably mounted with respect to the inner spool and the inner spool being provided with means for preventing rotation thereof relatively to the casing, said means comprising a number of pegs and corresponding openings on a pitch circle of which the centre coincides with the common axis of the spools.

The invention will now be described by way of example with reference to the accompanying drawings in which.

Figure 1:
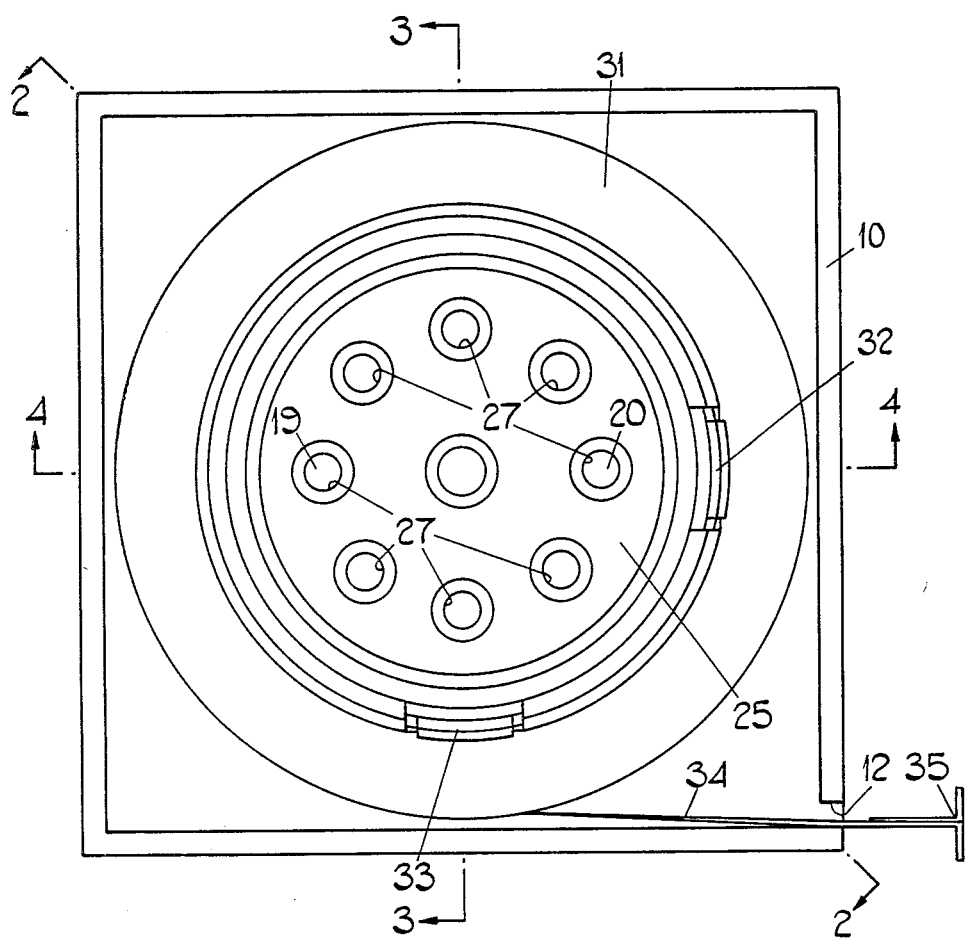
FIG. 1 is a plan view of a coilable tape measure constructed in accordance with the invention and with part of the casing removed to reveal the interior mechanism.
Figure 2:
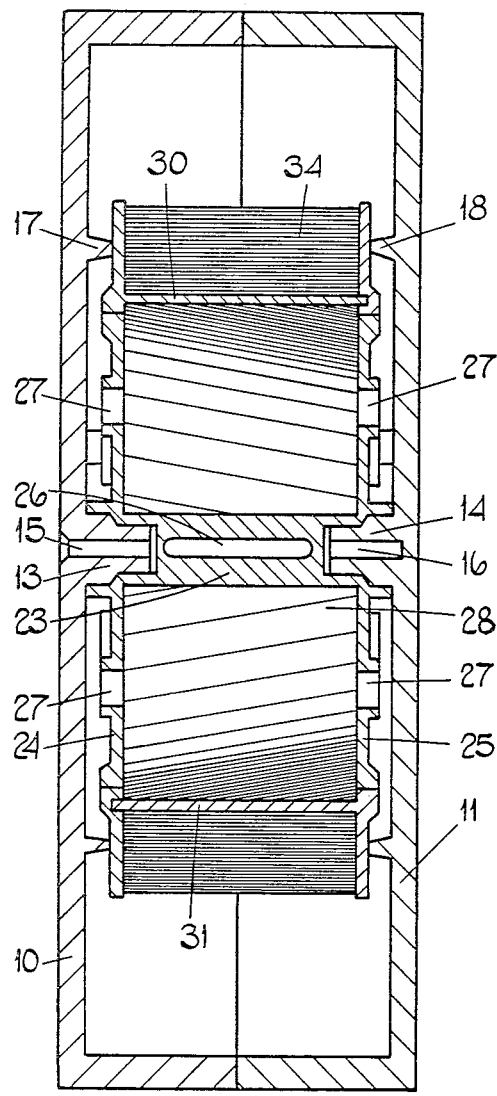
FIG. 2 is a cross-sectional view on the line 2—2 in FIG. 1.

The coilable tape measure shown in the drawings includes a casing formed of two halves 10, 11. For convenience, these are shown as shallow rectangular flanged parts but the external shape may be varied to conform more closely to the shape of the interior parts or otherwise as required.

At one corner each of the casing parts has a slot indicated at 12 in FIG. 1.

Figure 4:
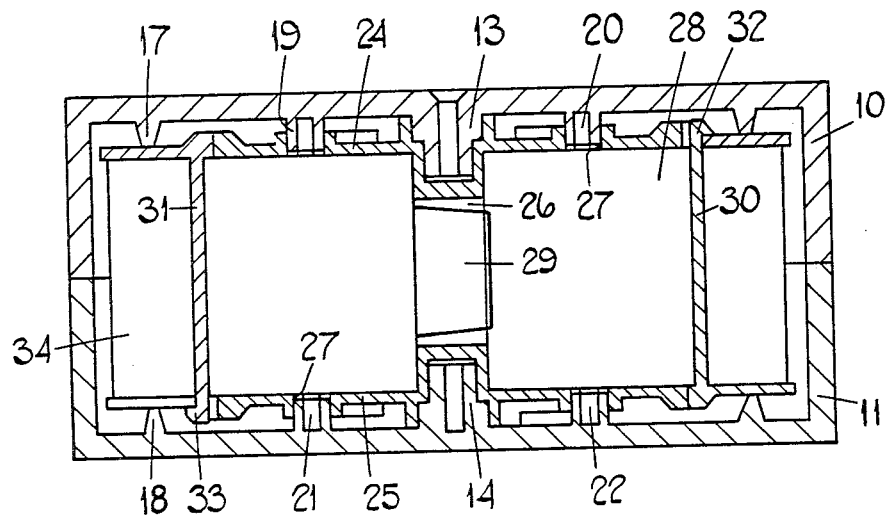
FIG. 4 is a cross-sectional view on the line 4—4 in FIG. 1.
Figure 5:
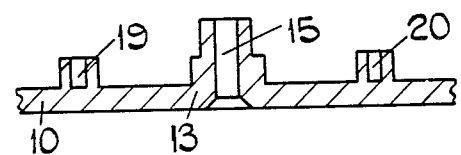
FIGS. 5 and 6 are cross-sectional and plan fragmentary views of the casing.
Figure 6:
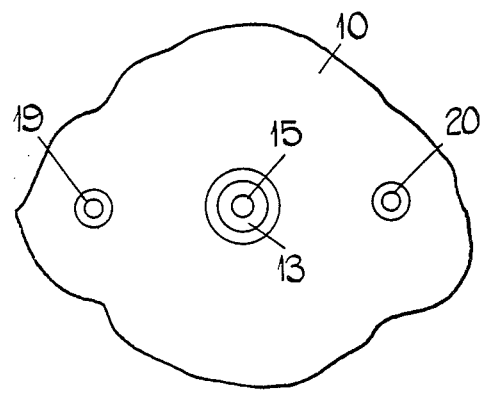

Each casing part has a central internal spigot 13, 14. The spigot 13 has a through hole 15 with a counter-sink at its outer end. This through hole 15 is to accept a screw for securing to the exterior of the casing a clip (not shown). The other spigot 14 has a blind hole 16 opening into the interior of the casing. Concentric with the spigots 13, 14 each casing half part 10, 11 has an annular internal ridge 17, 18. Intermediate the annular ridge and the spigot on each casing half there are two hollow short cylindrical pegs 19, 20, 21 and 22. These are shown in FIGS. 4, 5 and 6 and their positions are indicated in FIG. 1.

Contained within the casing is an assembly comprising inner and outer concentric spools. The inner spool comprises a one piece plastics moulding including an inner spindle portion 23 and two substantially parallel disc portions 24, 25 at opposite ends of the spindle portion respectively and having circular external peripheries. The ends of the spindle portion 23 are recessed to accommodate the spigots 13 and 14 respectively. Both the spigots and their recesses are of circular section and are stepped to provide location for the inner spool with respect to the casing. The spindle portion 23 furthermore has a central diametral slot 26. Each of the disc portions 24, 25 of the inner spool has a plurality of spaced holes 27. Each such hole 27 is surrounded on the external surface of the portions 24, 25 in which it is formed with a shallow raised annulus forming a reinforcement around said hole. The pegs 19, 20 formed integrally in the casing parts 10, 11 can engage in the holes 27. The holes are therefore on a pitch circle, the axis of which coincides with the axis of a pitch circle on which the pegs lie. Since there are only two pegs 19, 20, 21, 22 on each casing part 10, 11 and there are eight holes 27 in each of the disc portions 24, 25 of the inner spool it is possible to locate the inner spool in a number of different angular positions with respect to the casing.

Contained within the inner spool is a coiled flat strip steel spring 28. An inner end of the spring has tongue 29 engaging in the slot 26 in the spindle portion 23 of the inner spool. In an alternative arrangement the spring has an initial concave form to provide a bias.

Figure 3:
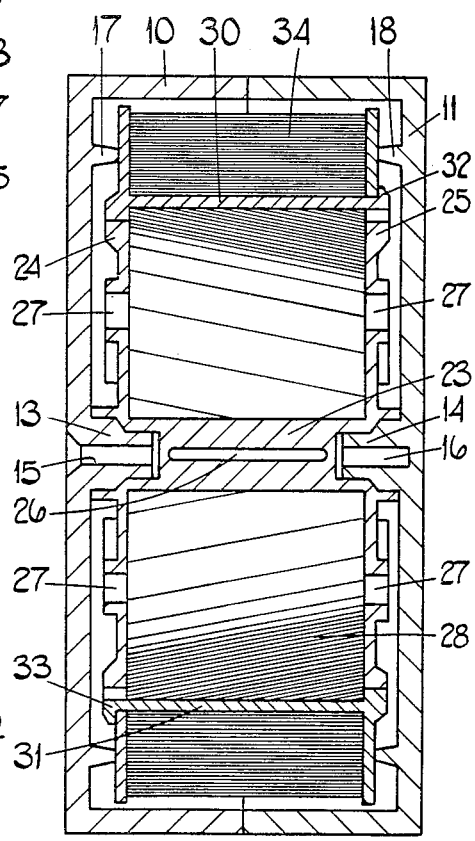
FIG. 3 is a cross-sectional view on the line 3—3 in FIG. 1.

Surrounding the inner spool is an outer spool comprising two parts 30, 31. These are engaged together by respective clip formations 32, 33 shown in FIGS. 1, 3 and 4. Each portion 30, 31 has two of these formations spaced apart by 90° with respect to the central axis of the spool. As shown in the drawings two 90° spaced clip formations 32, 33 engage in 90° spaced slots in the other portion of the outer spool so that the portions are held together in four spaced positions, two on one side of the spool and two on the other.

The outer spool encloses a steel flat strip measuring tape 34. The inner end of this passes through an opening (not illustrated) in the inner annular wall defined by the two portions of the outer spool 30, 31 and connects with the outer end of the spring 28 through this opening. The connection between the spring and the tape may be of the T-slot and T-shaped end engagement form or other arrangement which is easily interconnected during the assembly process.

The outer spool is journalled on the exterior circular peripheral edges of the disc portions 24, 25 of the inner spool as well as on the annular ridges 17, 18 in the casing.

The outer end of the tape 34 extends through the casing wall slot 12 and carries at said outer end an L-shaped fitting 35 preventing the said outer end of the tape passing into the interior of the casing.

In use, the tape may be withdrawn simply by pulling the end outwardly to any desired extent. This causes the outer spool to rotate with respect to the inner spool. The inner spool which houses the spring does not move with respect to the casing and is prevented from so doing by inter-engagement of the pegs 19, 20, 21, 22 in the holes 27 of the inner spool. The spring moves as the tape is withdrawn and is pre-tensioned to recoil the tape when it is allowed to return into the interior of the casing. The spring function is to recoil the tape but this is accomplished smoothly and with minimum change in tension applied to the tape. Furthermore, since both inner spool and outer spool are formed from plastics material with low co-efficient of friction the frictional losses resulting from movement of the spring are minimised.

During assembly of the tape measure the following steps are taken. First the spring 28 is cut to length and one end is softened. The spring is next wound onto the inner spool and is given a set or bias. The two portions of the outer spool are next clipped together and engaged over the inner spool with the spring end passing through a slot (not illustrated) in the outer spool. The inner end of the tape is next hooked onto the outer end of the spring. The spring which was pre-tensioned is now released whereupon the tape is wound onto the outer spool. The whole assembly is now located within the casing and appropriate spring tension is achieved by rotating the inner spool and locating with respective pegs 19, 20, 21, 22. The casing parts are now assembled together and secured by fastenings (not illustrated) which may conveniently be situated in the corners of the casing and spaced from the outer peripheral edge of the outer spool.

The casing may be formed from metal or plastics material and the size of the inner and outer spools as well as of the casing may be varied to accommodate tapes of different widths and lengths. Length variation determines the diameters both of the inner and of the outer spool.

I claim:

1. A coilable tape measure comprising a casing, a coilable tape having an outer end extending through an opening in the wall of the casing, and a recoil spring having its outer end connected to the inner end of the tape, the spring being mounted on an inner spool and the tape being mounted on a concentric outer spool rotatably mounted with respect to the inner spool and the inner spool being provided with means for preventing rotation thereof relatively to the casing, said means comprising a number of pegs and corresponding openings on a pitch circle of which the centre coincides with the common axis of the spools.

2. A measure as claimed in claim 1 in which the outer spool is formed from two parts secured together, and defining an opening through which the spring outer end and tape inner end are connected.

3. A measure as claimed in claim 1 or claim 2 in which the inner and outer spools are formed from material having a relatively low coefficient of friction.

4. A measure as claimed in any one of the preceding claims 1 or 2 in which the inner spool has a plurality of said openings and the corresponding pegs are formed on the casing.

5. A measure as claimed in any one of the preceding claims 1 or 2 in which the openings are circular holes and the pegs are circular section pegs.

6. A measure as claimed in any one of the preceding claims 1 or 2 in which there are more openings than corresponding pegs, to permit angular adjustment of the inner spool relatively to the casing.

* * * * *